United States Patent [19]

Healey, III

[11] 3,882,413

[45] May 6, 1975

[54] MICROWAVE SIGNAL SOURCE STABILIZED BY AUTOMATIC FREQUENCY AND PHASE CONTROL LOOPS

[75] Inventor: Daniel J. Healey, III, Baltimore, Md.

[73] Assignee: Westinghouse Electric Corp., Pittsburgh, Pa.

[22] Filed: July 30, 1973

[21] Appl. No.: 383,627

[52] U.S. Cl. .......................... 331/9; 331/12; 331/25

[51] Int. Cl. .......................... H03b 3/04

[58] Field of Search .......................... 331/9–12, 18, 331/25

[56] References Cited

UNITED STATES PATENTS 3,593,181 7/1971 Kuhn .......................... 331/12

*Primary Examiner*—Siegfried Grimm
*Attorney, Agent, or Firm*—R. M. Trepp

[57] ABSTRACT

A microwave signal source and method for providing a microwave output signal having an improved noise characteristic are disclosed. The desirable signal characteristic is obtained by generating an oscillator frequency control signal, preferably through the use of an automatic frequency control (AFC) loop, and by modifying the frequency control signal in response to a vernier phase control signal, preferably from an automatic phase control (APC) loop, in such a manner that desirable characteristics of both signals are employed in producing the microwave output signal.

13 Claims, 9 Drawing Figures

MICROWAVE SIGNAL SOURCE STABILIZED BY AUTOMATIC FREQUENCY AND PHASE CONTROL LOOPS

BACKGROUND OF THE INVENTION

1. Field of the Invention

The invention relates generally to oscillator control circuits and, more particularly, to a method and system for generating a microwave signal having improved noise characteristics through a dual control method and circuit.

2. State of the Prior Art

In typical radar and communications systems, particularly in doppler radar systems which detect targets in response to a frequency shift of the return signal, extremely low noise, microwave frequency signal sources are desirable. One measure of the noise content of a microwave signal is the ratio of the power in one phase noise sideband, referred to the input carrier frequency, on a per hertz of bandwidth spectral density basis, to the total signal power, at Fourier frequency $f$ from the signal's average frequency. The dimensionality is $HZ^{-1}$. (It is desirable that this power ratio be expressed in dB. Therefore $L(f)$ as used in this application will have units of dB/HZ). The $L(f)$ of a signal having low noise content typically is highest at the center frequency of the signal and is quite low at all other frequencies displaced slightly from the center frequency on either side thereof. Such a signal may be referred to as having low noise power levels at Fourier frequencies above some minimal Fourier frequency, e.g., Fourier frequencies above a Fourier frequency of 500 Hz, where Fourier frequency is defined as the frequency offset from the nominal frequency (i.e., center frequency) of the signal.

Available microwave signal sources such as crystal controlled oscillators may provide an output signal which has a sufficiently narrow power spectral density in that the signal power level is minimal at low Fourier frequencies about the desired nominal or center frequency of the oscillator. However, at high Fourier frequencies about the center frequency of the crystal controlled oscillator, the noise power level may be unacceptable.

On the other hand, a cavity resonator microwave transistor oscillator may provide a microwave signal having acceptable noise characteristics at the higher Fourier frequencies about the center frequency of the oscillator but may be unacceptable at the lower Fourier frequencies in the vicinity of the oscillator center frequency.

With either of the above types of microwave frequency signal sources, the output signal power density at frequencies other than in a narrow band about the oscillator center frequency may be sufficiently high that maximum system performance is not attainable, particularly in PAM doppler radar systems, i.e., pulse doppler radar systems that employ rectangle pulse amplitude modulation of a low noise carrier frequency. Such limitation of performance is most serious in low duty factor pulse doppler radar systems that employ either of the two previously described types of microwave signal sources for carrier frequency generation. The limitation is particularly serious at Fourier frequencies in the range 500 Hz to 50,000 Hz as a result of the effective folding of noise at high Fourier frequencies into the range of 500 Hz to 50,000 Hz as a result of the PAM.

OBJECTS AND SUMMARY OF THE INVENTION

It is accordingly an object of the present invention to provide an improved microwave signal source.

It is another object of the present invention to provide a novel method and system for generating a microwave signal having improved noise characteristics at all Fourier frequencies.

It is yet another object of the present invention to provide a novel method and system for generating a microwave signal by employing the desirable noise characteristics of both a crystal controlled oscillator and a cavity resonator transistor microwave oscillator.

It is a further object of the present invention to provide a novel method and system for generating a low noise microwave signal through the combined use of a frequency control loop and a vernier phase control loop in an oscillator circuit.

These and other objects are accomplished in accordance with the present invention to generate a low noise output signal by generating an oscillator frequency control signal and modifying the frequency control signal in response to a vernier phase control signal in such a manner that desirable characteristics of both control signals are employed in producing the output signal.

More specifically, a first signal having desirable noise power density characteristics at Fourier frequencies above a first Fourier frequency is obtained by means of an automatic frequency control means preferably utilizing a cavity resonator. A second signal having desirable noise power density characteristics at Fourier frequencies below the first Fourier frequency is utilized to phase control the first signal at least at those Fourier frequencies below the first Fourier frequency. The frequency of the first signal is thus controlled both in response to the automatic frequency control means and the phase control signal.

The first and second signals are preferably generated by a voltage controlled microwave transistor oscillator and a crystal controlled oscillator, respectively. The phase control signal is preferably generated by comparing the relative phases of the voltage controlled microwave transistor and crystal controlled oscillator output signals and the phase of the microwave transistor voltage controlled oscillator signal is shifted by an amount related to the amplitude of the phase control signal. The phase shifted signal may then be compared with a frequency control signal from a frequency determining device such as a cavity resonator excited by the voltage controlled oscillator output signal to generate a phase modified frequency control signal. The phase modified frequency control signal is utilized to control the voltage controlled oscillator frequency at low Fourier frequencies to thereby desirably control relatively slow (low frequency) phase fluctuations. At high Fourier frequencies, the rapid changes in phase are controlled exclusively by the frequency control signal. The voltage controlled oscillator output signal may be utilized to provide an output signal, and preferably, the voltage controlled oscillator signal appearing at the output of one part of the frequency determining device may be utilized to provide an output signal.

DETAILED DESCRIPTION

Figure 1A:
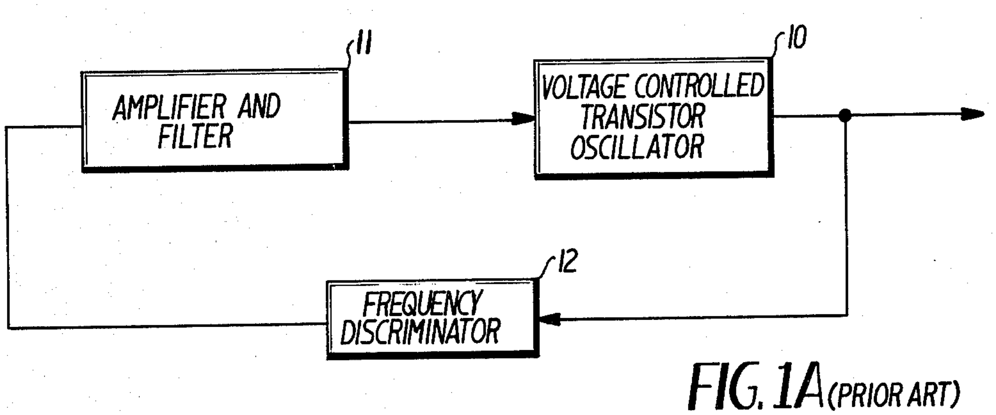
FIG. 1A (PRIOR ART)
FIG. 1A is a functional block diagram of a prior art frequency controlled voltage controlled microwave transistor oscillator circuit.

Referring to FIG. 1A where a typical frequency controlled, or frequency stabilized, microwave signal source employing a voltage controlled microwave transistor oscillator 10 is illustrated, the output signal from the voltage controlled microwave transistor oscillator 10 may be supplied to a transmitter unit (not shown) and may be applied to a conventional frequency discriminator 12. The error signal from the frequency discriminator 12 may be applied through a suitable amplifier and filter circuit 11 to the voltage controlled transistor oscillator 10 to control the frequency of the oscillator 10.

One indication of the frequency stability of the oscillator 10 is the angle modulation power spectral density $S_{\delta\phi}(f)$ of the oscillator output signal in that this quantity provides an indication of the relative power levels of the desired signal at the oscillator center frequency $f_o$ and undesired or noise signals at other frequencies. The single sideband angle modulation power spectral density referred to zero frequency for an oscillator output signal may be expressed in terms of decibels per cycle (dB/Hz) as follows:

$$10 \log_{10} L(f) = 10 \log_{10} \frac{S_{\delta\phi}(f)}{2} \text{dB/Hz.} \quad (1)$$

The quantity $S_{\delta\phi}(f)$ for an oscillator usually results from phase fluctuations of the oscillator signal due to thermal noise, shot noise, and modulation affects of low frequency noise occurring in the semiconducting devices, the resistors and the capacitors utilized in the oscillator. Such phase fluctuations result in noise at Fourier frequencies $f$ and the phase noise power spectral density may be expressed as the single sideband phase modulated signal power $L(f)$.

Since the oscillator of FIG. 1A contains a frequency determining circuit, the fluctuation of the phase of the output signal caused by phase fluctuations $S_{\delta\phi}(f)$ in the open loop transmission are converted to a fluctuation of oscillator frequency by virtue of the group delay property of the frequency determining circuit. Where a simple resonator such as a resonating cavity having a predetermined Q is utilized as the frequency determining element in the oscillator circuit, the group delay $d\phi/d\omega$ at the resonant frequency $fo$ of the resonator may be expressed as:

$$\frac{d\phi}{d\omega} = \frac{-1}{\pi} \frac{Q}{fo} \quad (2)$$

where $fo$ is the oscillator center frequency.

To obtain the highest possible frequency stability of the oscillator circuit, the group delay $d\phi/d\omega$ must be as large as possible. Thus, the effective Q of the resonator must be as large as possible and the phase shift introduced by the oscillator circuit at the oscillator frequency must be as close to $2\pi N$ as possible where N is a whole integer. Of course, if a resonator is utilized as the frequency determining element in the circuit of FIG. 1A, the resonator may be excessively loaded due to the coupling of a control signal therefrom, resulting in a lowering of the effective Q of the resonator. When excessive loop gain is employed in the oscillator 10 of FIG. 1A, the frequency of the signal utilized for control purposes is different from that of the resonator resonant frequency resulting in a lower group delay as well as an amplitude dependence which affects the harmonic currents and thus the resultant phase at the resonator controlled oscillator center frequency.

Assuming that harmonic currents can be neglected and that amplitude power spectral density is much smaller than the power spectral density due to phase fluctuations, the power spectral density of the output signal from the oscillator circuit of FIG. 1A may be expressed in terms of simply phase noise power spectral density as:

$$L_G(f) = 1/2 S_{\delta A\phi}(f) [1 + (fo/2Qf)^2] \quad (3)$$

The single-sided power spectral density $S_{\delta G}(f)$ is related to $L_G(f)$ by $$L_G(f) \approx (1/2 \text{ rad}^2) S_{\delta G}(f) \quad (4)$$

when phase fluctuations occurring at rates $f$ and faster are small compared to one radian. (NOTE: There is an $L_A(f)$ for the amplifier-limiter of an oscillator and an $L_G(f)$ for the entire oscillator).

The above equations are the fundamental equations describing the short term frequency stability of a harmonic oscillator. The first term of equation (3) is the frequency noise of the oscillator and the second term is the additive phase noise. It can be seen that for a Fourier frequency $f$ less than the quantity $f_o/2Q$, the oscillator output signal noise power spectrum is dominated by the frequency noise term. For Fourier frequencies $f$ greater than the quantity $f_o/2Q$, the phase noise term dominates the oscillator output signal noise power spectrum.

The above principles may be applied to the frequency controlled microwave transistor oscillator circuit of FIG. 1A assuming an effective Q of 200. The voltage controlled oscillator 10 may itself have a Q of from 10 to 20. However, because of the use of feedback via a frequency discriminator the entire oscillator loop can be described in terms of a simple harmonic oscillator. A simple harmonic oscillator satisfies the van der Pol nonlinear differential equation for an electrical oscillator, and thus contains (1) a resonator that is the principle frequency determining element; (2) an amplifier to provide positive feedback and sufficient gain that oscillation will build up; (3) a limiter to stabilize the incremental gain after build up of the oscillation so that constant amplitude-sustained oscillation occurs. The resonator Q of 200 refers to the effective Q of the entire apparatus of FIG. 1A when its operation is described in terms of the van der Pol oscillator.

Figure 1B:
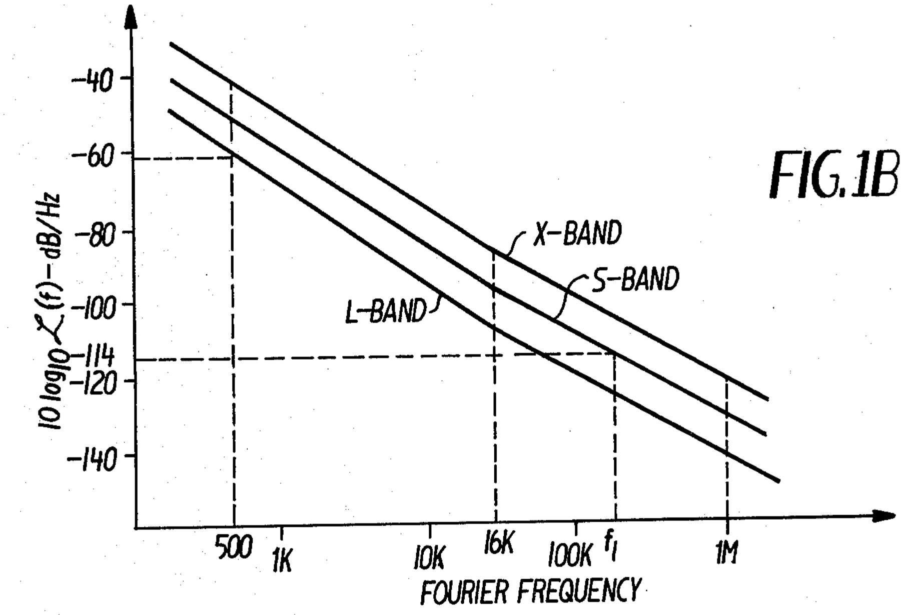
FIG. 1B is a graph illustrating the single sideband power spectral density of the phase noise of the circuit of FIG. 1A as a function of Fourier frequency.

The single sideband power spectral density $L(f)$ of the oscillator output signal versus the Fourier frequency (i.e., frequency offset from the center frequency $f_o$) for the circuit of FIG. 1A may be plotted as in FIG. 1B for output signals in the indicated frequency bands. It can be seen from FIG. 1B, for example, that at a Fourier frequency of 500 Hz and an oscillator center frequency at L-band, the S-band single sideband power spectral density of the output signal is −50 dB/Hz.

In many systems involving coded coherent radar signalling in the presence of large coherent interfering signals, it may typically be required that the microwave signal source provide an output signal having a single sideband power spectral density at a Fourier frequency of 500 Hz of approximately −114 dB/Hz. The oscillator circuit of FIG. 1A, even assuming a relatively high Q of 200, cannot meet this condition. In fact, this acceptable power spectral density of −114 dB/Hz is only achieved at Fourier frequencies beyond a frequency $f_1$ which is above 100 KHz.

Figure 1C:
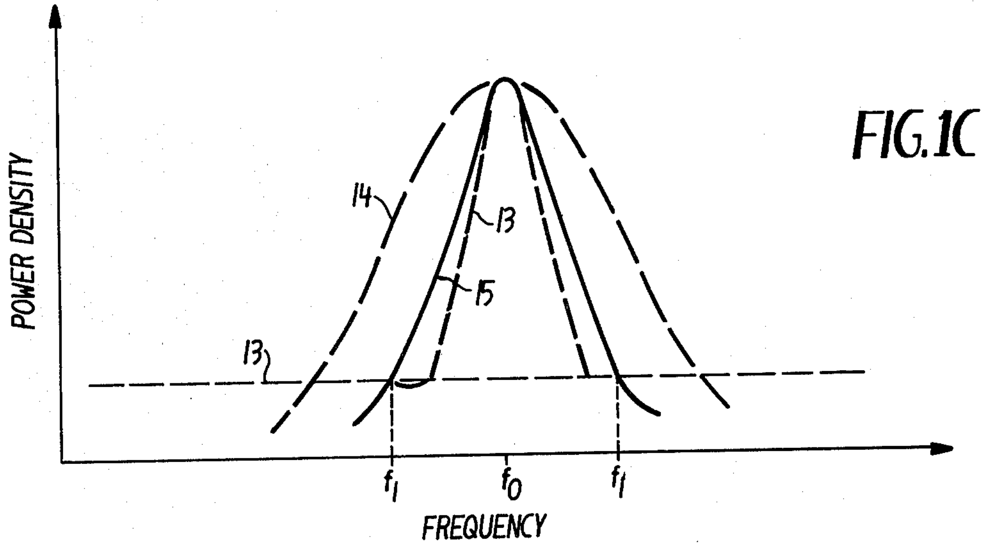
FIG. 1C is a graph illustrating the power spectral density of the output signal from the circuit of FIG. 1A as a function of frequency.

The results of oscillator instability may be more clearly seen in the graph of FIG. 1C. Assuming that the phantom line 13 indicates an acceptable noise power density, the phantom line 14 may represent the output signal power density of the oscillator 10 without automatic frequency control. With the frequency control loop illustrated in FIG. 1A, the oscillator output signal noise power density may be decreased so that the noise power density is acceptable at the Fourier frequency $f_1$. However, as was previously discussed, this frequency may be on the order of 100 KHz resulting in an output signal power density spectrum which is excessive in width.

Figures 2A, 2B:
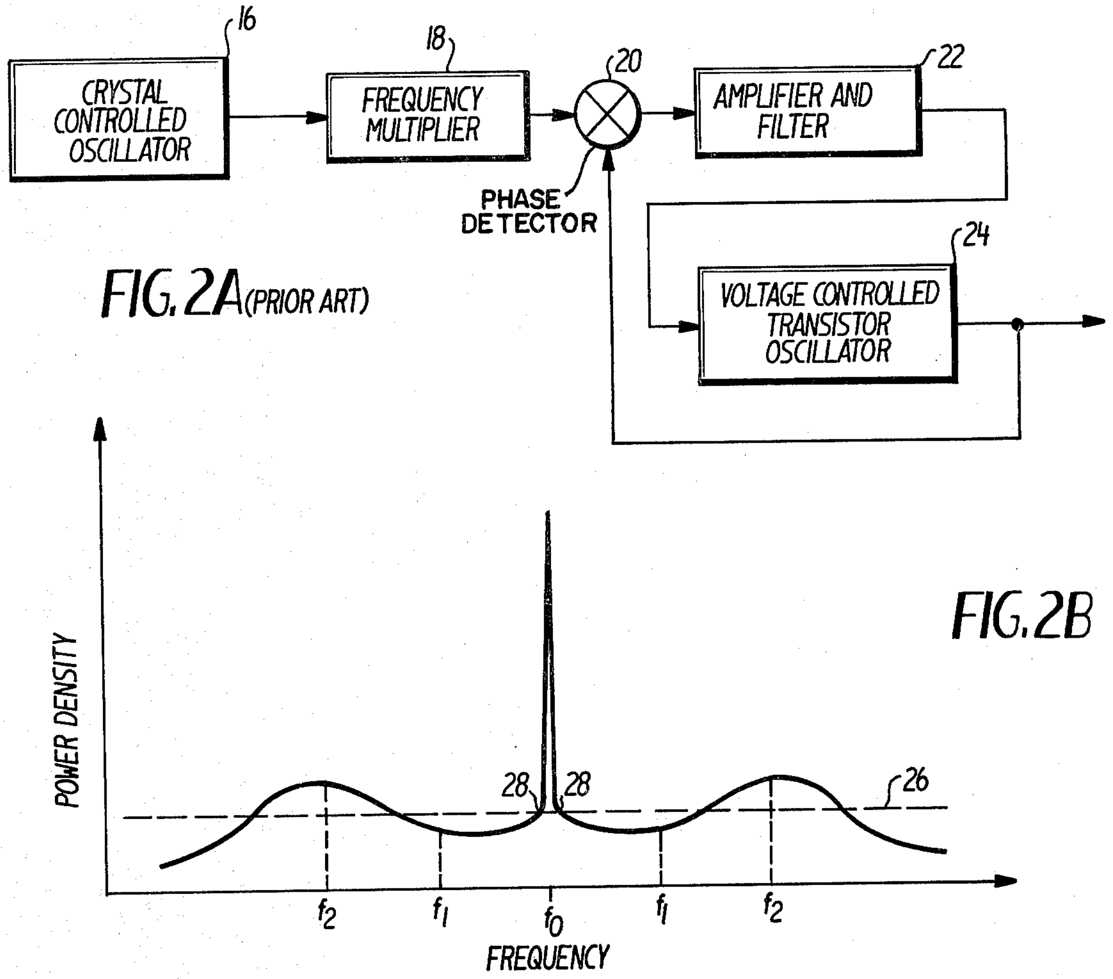
FIG. 2A (PRIOR ART) FIG. 2B
FIG. 2A is a functional block diagram of a prior art crystal controlled oscillator frequency control circuit employing a phase locked loop.
FIG. 2B is a graph illustrating the power spectral density of the circuit of FIG. 2A as a function of frequency.

To improve the performance of microwave signal sources, it has been suggested that a high frequency (HF) or very high frequency (VHF) crystal controlled oscillator and a low noise frequency multiplier be utilized to phase lock the voltage controlled transistor oscillator. For example, as is illustrated in FIG. 2A, the output signal from a high frequency crystal controlled oscillator 16 may be multiplied by a frequency multiplier 18 to provide an output signal in the desired frequency band. The output signal from the frequency multiplier 18 may be applied to one input terminal of a suitable conventional phase detector 20 and the output signal from the phase detector 20 may be applied through a suitable conventional amplifier and filter circuit 22 to control the frequency of a voltage controlled transistor oscillator 24. The output signal from the voltage controlled transistor oscillator 24 may be provided as an output signal to the transmitter unit (not shown) and may also be fed back to one input terminal of the phase detector 20 for comparison with the signal from the frequency multiplier 18.

The resultant graph of power density versus frequency for the circuit of FIG. 2A is illustrated in FIG. 2B. Assuming that a noise power density level at or below the phantom line 26 is acceptable, the points 28 may represent an acceptable power level at Fourier frequencies of 500 Hz on either side of the center frequency $f_o$. The microwave signal source of FIG. 2A thus provides an acceptable output signal between the center frequency $f_o$ and the Fourier frequency $f_1$ at which the output signal from the microwave signal source of FIG. 1A is unacceptable. However, noise power densities above the acceptable level indicated at 26 may exist at higher Fourier frequencies centered about a Fourier frequency $f_2$.

These undesirable excursions of noise power density level above the acceptable level 26 centered about the frequency $f_2$ may be improved somewhat by decreasing the bandwidth of the amplifier and filter 22. However, with the circuit of FIG. 2A it may then be impossible to lower the noise power density level below the acceptable level 26 at all Fourier frequencies.

Figure 3A:
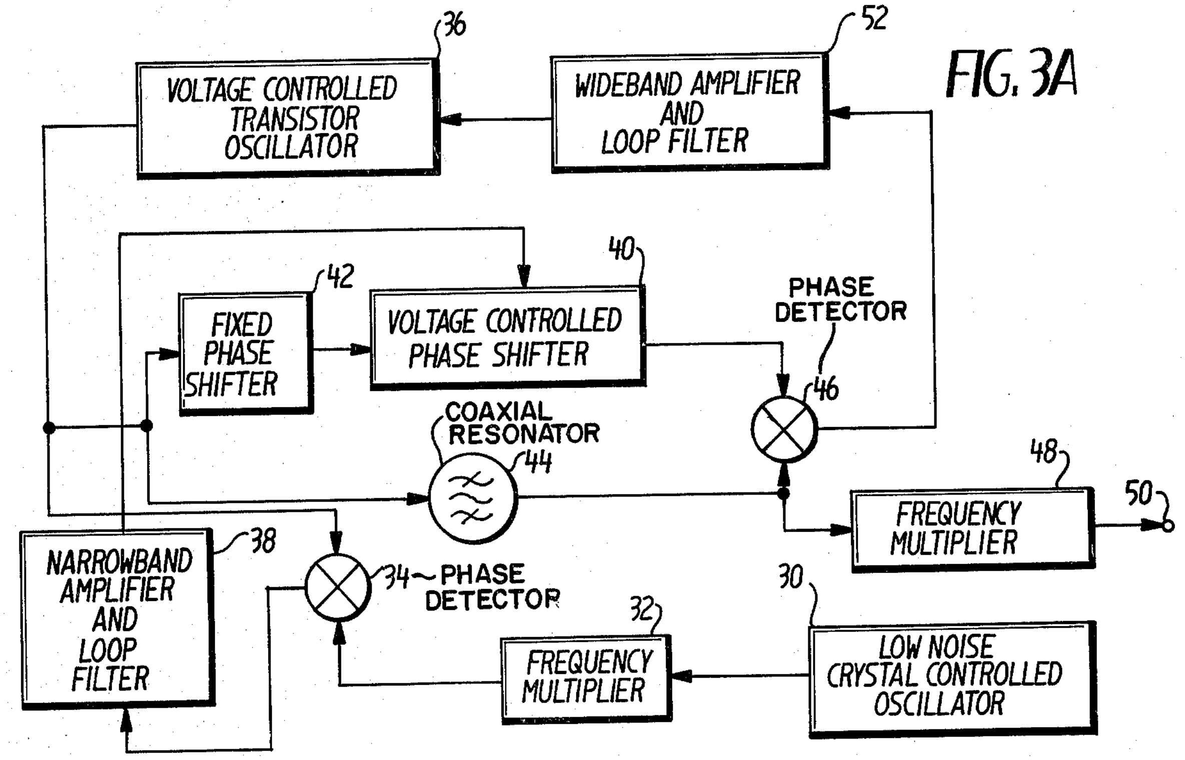
FIG. 3A is a functional block diagram of a preferred embodiment of a low noise signal source according to the present invention.

In accordance with the present invention, a microwave frequency source having more acceptable phase fluctuations and thus more acceptable noise power densities at low as well as high Fourier frequencies is provided. Referring now to FIG. 3A wherein a preferred embodiment of the present invention is illustrated, the output signal from a variable frequency, low noise crystal controlled oscillator 30 is increased in frequency by a low noise frequency multiplier 32 such as a transistor-hot carrier diode or varactor diode frequency multiplier and applied to one input terminal of a suitable conventional phase detector 34 to which may be applied the output signal from a conventional voltage controlled transistor oscillator 36. The output signal from the phase detector 34 is applied through a narrow band amplifier and loop filter 38 to the control input terminal of a voltage controlled phase shifter 40.

The output signal from the voltage controlled transistor oscillator 36 is also applied to a conventional fixed phase shifter 42 and to a conventional frequency determining element such as a coaxial resonator 44. An output signal from the fixed phase shifter 42 is applied through the voltage controlled phase shifter 40 to one input terminal of a conventional phase detector 46 and an output signal from the coaxial resonator 44 may be applied to the other input terminal of the phase detector 46. The output signal from the phase detector 46 may be applied through a suitable wide band amplifier and loop filter 52 and to the control input terminal of the voltage controlled transistor oscillator 36.

The output signal from the resonator 44 may be applied to a conventional frequency multiplier 48 such as a step recovery diode frequency multiplier. The output signal from the frequency multiplier 48 may be provided to the transmitter unit (not shown) by way of an output terminal 50.

In operation, the frequency of the output signal from the voltage controlled oscillator 36 is determined primarily by the resonant frequency of the coaxial resonator 44. The output signal from the voltage controlled oscillator 36 is applied to the coaxial resonator 44 and is phase shifted by approximately 90° ($\pi/2$ radians) by the fixed phase shifter 42. Assuming that no control signal is applied to the voltage controlled phase shifter 40, the 90° phase shifted signal from the fixed phase shifter 42 is compared in phase with the output signal from the coaxial resonator 44 to produce a frequency control signal from the phase detector 46 indicating the phase relationship between the signals applied thereto. In this respect, the phase detector 46 may provide an output signal of one polarity for a phase difference between the applied signals of less than 90° and of the opposite polarity for a phase difference between the applied signals of more than 90°. Because of the $d\phi/d\omega$ characteristic of the coaxial resonator 44, this phase difference is a measure of the changes in frequency of the oscillator 36.

The frequency control signal from the phase detector 46 is amplified and filtered by the wide band amplifier and loop filter 52 and applied to the voltage controlled transistor oscillator 36 to control the frequency thereof. An automatic frequency control (AFC) loop preferably comprising the voltage controlled transistor oscillator 36, the fixed phase shifter 42, the coaxial resonator 44, the phase detector 46 and the amplifier and loop filter 52 is thus provided. Through this AFC loop, the $L(f)$ of the output signal from the voltage controlled transistor oscillator 36 is maintained at an acceptable level at Fourier frequencies above some first predetermined Fourier frequency and the power density spectrum may be similar to that illustrated in FIG. 1C.

However, an automatic phase control (APC) loop preferably comprising the low noise crystal controlled oscillator 30, the frequency multiplier 32, the phase detector 34, the amplifier and loop filter 38 and the voltage controlled phase shifter 40 is also provided. This APC loop provides a vernier control of the frequency of the output signal from the voltage controlled transistor oscillator 36 at the low Fourier frequencies preferably below some second predetermined Fourier frequency lower than the first Fourier frequency, e.g., Fourier frequencies below 50 KHz. In this regard, the low noise crystal controlled oscillator 30 may be adjusted in frequency as will hereinafter be described in detail so that the center frequency of the output signal from the frequency multiplier 32 applied to the phase detector 34 is substantially the same as the center frequency of the output signal from the voltage controlled transistor oscillator 36, i.e., both signals have a center frequency $f_o$.

The phase detector 34 thus provides a phase control output signal indicative of the phase relationship between the output signals from the crystal controlled oscillator 30 and the voltage controlled oscillator 36. This phase control signal, when amplified and filtered by narrow band amplifier and loop filter 38, may be utilized to alter or modify the total phase shift through the fixed phase shifter 42 and the voltage controlled phase shifter 40. This, in turn, modifies the frequency control signal applied to the voltage controlled oscillator.

For example, the voltage controlled phase shifter 40 may provide a phase variation of ±0.2 radians about a nominal $\pi/2$ radian phase shift provided by the fixed phase shifter 42. This fine degree of control may be limited to a Fourier frequency range of between 0 and 25–50 KHz by the limited bandwidth of the narrow band amplifier and loop filter 38. In this manner, the output signal from the voltage controlled transistor oscillator 36 exhibits a desirable power density versus frequency characteristic similar to that illustrated in the curve of FIG. 2B in the frequency range $f_o \pm f_1$.

For Fourier frequencies above the 25–50 KHz upper bandwidth limit of the narrow band amplifier and filter 38, the APC loop has little or no effect on the frequency control of the voltage controlled transistor oscillator 36. Above this upper limit, the AFC loop previously described controls the frequency of the oscillator 36 and provides the desirable output signal power density spectrum similar to that illustrated for higher Fourier frequencies in FIG. 1C.

Figure 3B:
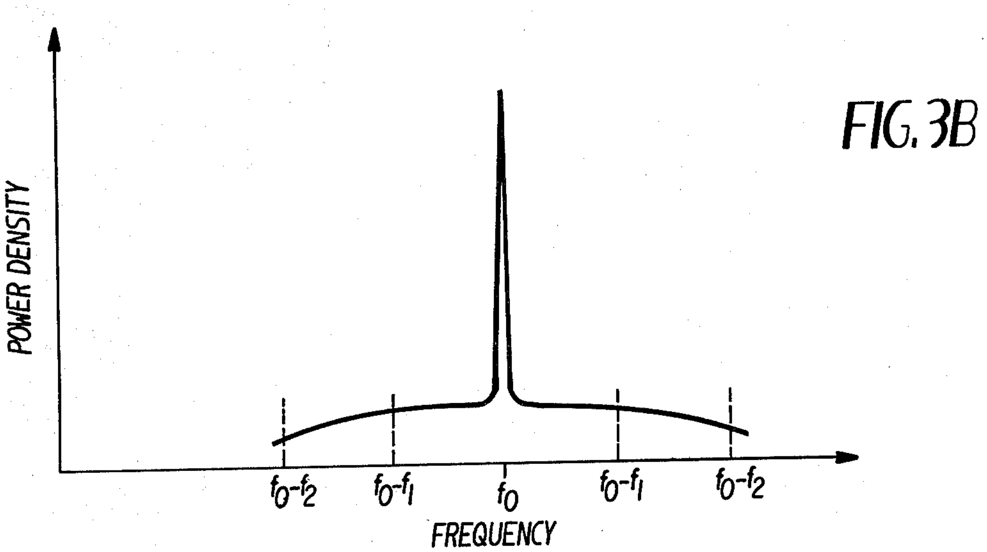
FIG. 3B is a graph illustrating the power spectral density of the signal source of FIG. 3A as a function of frequency.

As is illustrated in FIG. 3B, the resultant power density spectrum of the output signal from the circuit of FIG. 3A may essentially be considered a composite of the curves of FIGS. 1C and 2B. Since the crystal controlled oscillator APC loop provides a fine phase adjustment at the lower Fourier frequencies, e.g., in the range $f_0 \pm f_1$, the noise power density is acceptable within this frequency range. At higher Fourier frequencies where the crystal controlled oscillator APC loop might exhibit noise level increase, e.g., at frequencies centered about $f_o \pm f_2$, the AFC loop is the primary frequency determining circuit and the noise power level does not exceed an acceptable level.

There are, of course, two resonators in the circuit of FIG. 3A: (*a*) the quartz crystal unit in the oscillator 30, and (*b*) the coaxial resonator 44. Without the quartz crystal unit and vernier phase lock loop, the nominal frequency of the oscillator 36 is controlled by the resonator 44. When the AFC controlled oscillator loop is phase locked to the harmonic of the crystal controlled oscillator 30, the frequency of the AFC controlled loop (i.e., its nominal frequency as well as instantaneous frequencies occurring at rates corresponding to an associated power spectrum between $f_o$ and $f_1$ (FIG. 2B) must be controlled by the nominal frequency of the harmonic of the crystal controlled oscillator 30. The range over which such static frequency control of the AFC controlled oscillator loop is possible without degrading the AFC loop noise reducing properties is about ±0.1 $f_o$/Q about the center frequency of the AFC controlled oscillator loop. This corresponds to static phase error or deviation from $\pi/2$ phase shift at the phase detector 46 of about ±0.2 radian. The uncertainty of the AFC controlled frequency will be $\pm 3\times10^{-5}$ or ±30,000 Hz typically.

The uncertainty of the crystal controlled oscillator nominal frequency will be typically $\pm 1\times10^{-5}$ in the manufacturing of the crystal, and $\pm 4\times10^{-6}$ due to temperature and $5\times10^{-6}$ per year due to aging. A manual adjustment can accommodate the "setting" error of $\pm 1\times10^{-5}$. The total variation without adjustment of the coaxial resonator 44 (by means of a fine threaded probe) over a year is then worst case $\pm 4\times10^{-5}$ or ±40,000 Hz.

Although this would be slightly more than we would like to exist, the apparatus would still function satisfactorily since the ±0.2 radian is conservative. Furthermore, the variation with temperature is unlikely to exhibit a worst case maximum error between the coaxial resonator 44 and the crystal unit in the oscillator 30. In other words, it is the differential frequency error between the coaxial resonator 44 and the crystal resonator in the oscillator 30 that is important. By appropriate design of the quartz crystal unit utilizing, for example, a doubly rotated Y-cut crystal unit, the crystal unit and the coaxial resonator 44 can be caused to have the same type of temperature characteristics so that the differential error can be maintained easily less than $\pm 2\times10^{-5}$ per year which is then a maximum static error from $\pi/2$ at the phase detector 46 well within the previously mentioned conservative design goal. Therefore, it is not necessary to provide a fine mechanical vernier adjustment of the coaxial resonator 44 to maintain the apparatus at peak performance with age and temperature variation.

In the preferred embodiment of the signal source of FIG. 3A, the crystal controlled oscillator 30 is preferably a VHF oscillator. The voltage controlled oscillator 36 preferably operates in the L-band range and provides an output signal power level of about 2 watts. The frequency multiplier 32 increases the frequency of the VHF signal from the crystal controlled oscillator 30 to the L-band range and the frequency multiplier 48 may multiply the L-band output signal from the coaxial resonator 44 by approximately 10 to provide an output signal in the X-band range, by 3 to provide an output signal in the S-band range, or by 5 to provide an output signal in the C-band range. Of course, the L-band output signal may be directly utilized if an output signal in this lower frequency range is desired.

In one embodiment of the invention, the crystal controlled VHF oscillator 30 preferably employs an AT-cut fifth overtone crystal unit as the frequency determining element. The frequency stability of such an oscillator is typically $5\times10^{-6}$ per year or better at a given temperature. Since the frequency of an AT-cut crystal resonator is dependent on the angle of cut and the resonator temperature, as is well known, crude temperature control may be required to maintain a reasonably good frequency stability.

The crystal resonator preferably has a temperature "turnover" point (temperature at which $df/dT=o$) sufficiently high that control of temperature within ±10°C. will result in a frequency variation of less than $\pm(4\times10^{-6})(f_o)$ Hz or ±4,000 Hz.

Moreover, to provide adjustability, a conventional voltage tunable reactance may be employed in the frequency determining circuit of the crystal controlled oscillator 30. This voltage tunable reactance provides adjustability on the order of $\pm(1\times10^{-5})(f_o)$ Hz. without significantly degrading the effective Q of the crystal unit.

The frequency multiplier 32 may employ high Q tuning diodes such as varactor diodes having a $\gamma$ of about 0.5, rather than the commonly employed hyper-abrupt or step recovery diodes. The high Q varactor diodes are reverse biased during all portions of the complex voltage across the diodes.

With the above-described arrangement, it is possible to achieve an overall crystal controlled oscillator Q of about 80,000 at 100 MHz. The resultant phase fluctuation at a Fourier frequency of 1,000 Hz may typically be about $1.16\times10^{-15}$ radians²/Hz decreasing to a substantially constant level of about $1.2\times10^{-16}$ radians²/Hz at Fourier frequencies about 95 KHz, particularly where transistors are selected for high $f_t$, low $r_{bb}$ and high $h$FE.

The frequency determining coaxial resonator 44 is necessarily an L-band resonator when employed with an L-band voltage controlled oscillator. The resonator 44 is preferably temperature compensated in a conventional manner so as to provide a frequency error of less than about $(3\times10^{-5})(f_o)$ Hz.

The voltage controlled phase shifter 40 is preferably a shorted transmission line terminated by a pair of back-to-back, reverse biased, series connected varactor diodes. The pair of diodes may be connected to one port of a three-port circulator and the phase shifted output signal is coupled from a second port of the circulator. The phase shift control signal may be applied to the pair of diodes and, for the power levels required, the peak-to-peak L-band signal across each diode is maintained at a small value compared to the phase shift control signal so that distortion of the phase shifted L-band signal is negligible. A very linear phase shift versus control signal characteristic over a range of ±0.2 radian may be provided in this manner with an appropriate length of transmission line.

The phase detector 46 is preferably a ring modulator employing hot-carrier Schottky barrier diodes. The phase detector 46 thereby provides a d.c. output signal at very low impedance levels which stably remains at 0 volts with the phase relationship between the applied signals at a quadrature (90°) phase relationship. Moreover, the phase detector 46 provides a phase sensitivity of 0.2 volts/radian with input signal power levels of only ±3 dBm. The equivalent input phase noise of such a phase detector is about 20 dB lower than is attainable with detectors using other types of diodes. For example, the input single sideband phase modulated signal power $L(f)$ at a Fourier frequency of 1 Hz may typically be on the order of $1.6\times10^{-13}$ radian²/Hz and the equivalent phase noise at the detector output decreases with increasing Fourier frequency at a $1/f$ power spectral density.

Although not illustrated, a suitable conventional attenuator may be inserted between the coaxial resonator 44 and the phase detector 46 so that the resonator 44 provides a signal power level of about +3 dBm to the phase detector 46. Moreover, a conventional buffer amplifier may be utilized to amplify the resonator 44 output signal to a signal power level of about +30 dBm for driving the frequency multiplier 48. An output signal power level of between 10 and 50 milliwatts may thus be made available at the output terminal 50.

As was previously mentioned, two feedback control loops are provided by the circuit of FIG. 3A. The AFC loop (i.e., the voltage controlled oscillator 36, the phase shifters 42 and 40, the resonator 44, the phase detector 46 and the amplifier and loop filter 52) preferably has an open loop gain in excess of about 22.2 dB at low frequencies. A desirable loop gain may thus be 30 dB which results in a unity gain frequency of about 8.15 MHz.

This unity gain frequency would ordinarily dictate an AFC loop bandwidth of about 8.15 MHz. While this bandwidth may ordinarily be obtained, the use of a conventional lag-lead network in the amplifier and loop filter 52 may permit the reduction of the AFC loop bandwidth to about 2 MHz without compromising signal quality.

The APC loop (i.e., the crystal controlled oscillator 30, the frequency multiplier 32, the phase detector 34 and the amplifier and loop filter 38) may have an overall loop gain as low as +23 dB at a Fourier frequency of 2,000 Hz when utilizing a low noise oscillator and multiplier. The required APC loop bandwidth may be on the order of 28,000 Hz to achieve acceptable results. These minimal requirements may be met in any suitable conventional manner. For example, the narrow band amplifier and loop filter 38 may be compensated by a conventional lag-lead network having an upper frequency response of about 400 to 3,000 Hz.

Figure 4:
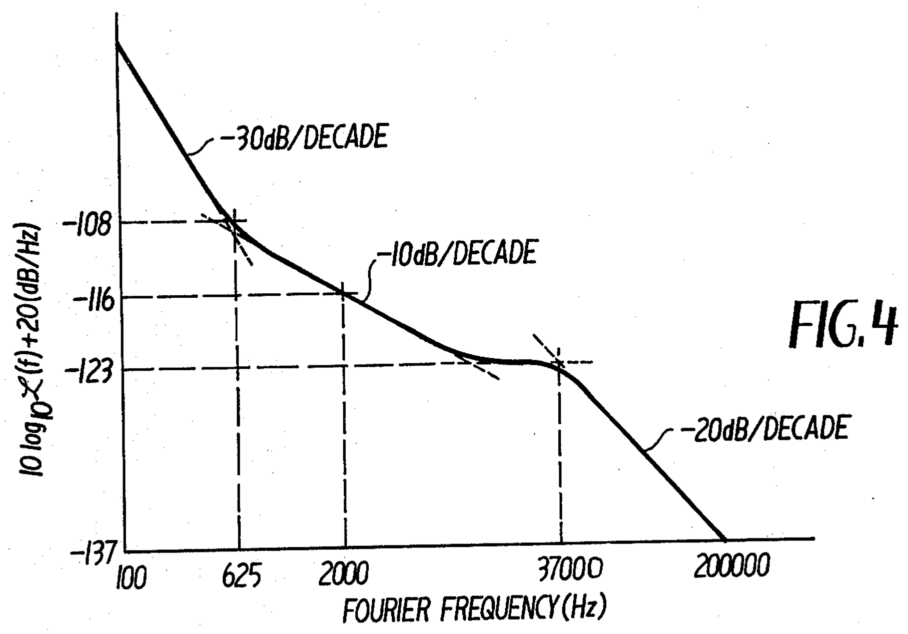
FIG. 4 is a graph illustrating the single sideband power spectral density of the phase of the source of FIG. 3A as a function of Fourier frequency with a times ten frequency multiplier employed to raise the frequency of the output signal; and, FIG. 5 is a graph illustrating the single sideband power spectral density of the source of FIG. 3A as a function of Fourier frequency with a times 3 multiplier employed to raise the frequency of the output signal.

With the above described oscillator circuit as illustrated functionally in FIG. 3, an X-band output signal having a single sideband power density spectrum of FIG. 4 may be obtained. As can be seen from the graph of FIG. 4, the noise level is lower than previously attainable over the entire spectrum. For example, the single sideband power $L(f)$ is about −108 dB/Hz at a Fourier frequency of 625 Hz and drops off to −123 dB/Hz at a Fourier frequency of 37,000 Hz.

Figure 5:
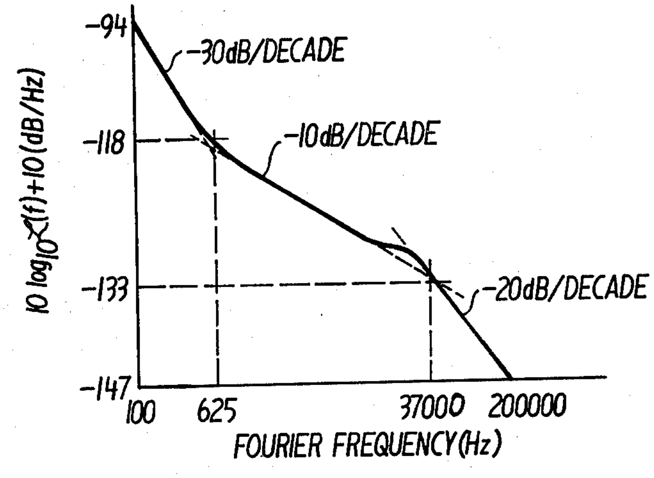

Similarly, if a times 3 multiplier is employed for the frequency multiplier 48, slightly better results may be obtained as is illustrated in FIG. 5. At a Fourier frequency of 625 Hz, the $L(f)$ is about −118 dB/Hz dropping of to −133 dB/Hz at 37,000 Hz. The present invention clearly provides a microwave signal source having greatly improved noise characteristics. The source may be employed over a wide range of radio frequencies to provide a relatively low noise signal with a high degree of reliability and without excessive overall cost.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for controlling the frequency of a signal comprising the steps of:

generating a first signal having a noise power density below a predetermined level at Fourier frequencies above a first Fourier frequency, the frequency of the first signal being automatically controlled about a predetermined center frequency by a frequency control signal provided by a frequency discriminator in an automatic frequency control loop;

generating a second signal having a frequency approximately equal to said center frequency and having a noise power density below said predetermined level at Fourier frequencies below a second Fourier frequency higher than the first Fourier frequency;

generating a phase control signal responsively to a phase comparison between the first and second signals;

modifying the frequency control signal in response to the phase control signal at Fourier frequencies below the second Fourier frequency;

controlling the frequency of the first signal in response to the modified frequency control signal;

modifying the first signal by means of a passive resonant frequency determining element, said passive resonant frequency determining element being part of said frequency control loop; and, providing said modified first signal as an oscillator output signal.

2. The method of claim 1 wherein the frequency control signal is generated by:

shifting the phase of a portion of the first signal by a fixed amount to provide a phase shifted first signal; and, comparing the phase of said modified first signal to the phase of the phase shifted first signal.

3. A method for controlling the frequency of a signal comprising the steps of:

generating a first signal having a noise power density below a predetermined level at Fourier frequencies above a first Fourier frequency, the frequency of the first signal being automatically controlled about a predetermined center frequency by a frequency control signal provided by a frequency discriminator in an automatic frequency control loop;

generating a second signal having a frequency approximately equal to said center frequency and having a noise power density below said predetermined level at Fourier frequencies below a second Fourier frequency higher than the first Fourier frequency;

generating a phase control signal responsively to a phase comparison between the first and second signals;

modifying the frequency control signal in response to the phase control signal at Fourier frequencies below the second Fourier frequency;

controlling the frequency of the first signal in response to the modified frequency control signal; and wherein the frequency control signal is generated by:

applying the first signal to a resonant, frequency determining element to generate a frequency reference signal;

shifting the phase of a portion of the first signal by a fixed amount to provide a phase shifted first signal;

comparing the phase of the reference signal to the phase of the phase shifted first signal; and wherein the frequency control signal is modified by the phase control signal by shifting the phase of the phase shifted first signal by an amount related to the magnitude of the phase control signal.

4. A method for controlling the frequency of a signal comprising the steps of:

generating a first signal having a noise power density below a predetermined level at Fourier frequencies above a first Fourier frequency, the frequency of the first signal being automatically controlled about a predetermined center frequency by a frequency control signal provided by a frequency discriminator in an automatic frequency control loop;

generating a second signal having a frequency approximately equal to said center frequency and having a noise power density below said predetermined level at Fourier frequencies below a second Fourier frequency higher than the first Fourier frequency;

generating a phase control signal responsively to a phase comparison between the first and second signals;

modifying the frequency control signal in response to the phase control signal at Fourier frequencies below the second Fourier frequency;

controlling the frequency of the first signal in response to the modified frequency control signal; and wherein the frequency control signal is generated by:

applying the first signal to a resonant, frequency determining element to generate a frequency reference signal;

shifting the phase of a portion of the first signal by a fixed amount to provide a phase shifted first signal;

comparing the phase of the reference signal to the phase of the phase shifted first signal; and wherein the frequency control signal is modified by the phase control signal only at Fourier frequencies lower than the second Fourier frequency by:

filtering the phase control signal to remove all components having frequencies above a predetermined frequency lower than the second Fourier frequency; and shifting the phase of the portion of the first signal by an amount related to the magnitude of the phase control signal.

5. A method for controlling the frequency of an output signal from a voltage controlled oscillator with a high degree of stability comprising the steps of:

generating a phase control signal related in amplitude to the phase relationship between the voltage controlled oscillator output signal and a crystal controlled oscillator output signal;

shifting the phase of a portion of the voltage controlled oscillator output signal by a predetermined fixed amount modified by a variable amount related to the amplitude of the phase control signal;

generating a frequency control signal related in amplitude to the phase relationship between the phase shifted voltage controlled oscillator output signal and an output signal from a frequency determining element excited by the voltage controlled oscillator output signal; and, controlling the frequency of the voltage controlled oscillator output signal responsively to the frequency control signal.

6. The method of claim 5 including the step of filtering the phase control signal to remove components having a frequency above a predetermined Fourier frequency.

7. Apparatus for controlling the frequency of a periodic signal comprising:

means for generating a first signal controllable in frequency about a predetermined center frequency, said first signal having a noise power density below a predetermined level at Fourier frequencies above a first Fourier frequency;

means for generating a second signal having a frequency approximately equal to said center frequency and having a noise power density below said predetermined level at Fourier frequencies below a second Fourier frequency higher than the first Fourier frequency;

means for comparing the first and second signals in phase and for generating a phase control signal responsively to the phase comparison between the first and second signals;

means for generating a frequency control signal responsively to the first signal;

means for modifying the frequency control signal in response to the phase control signal at Fourier frequencies below the second Fourier frequency;

means for controlling the frequency of the first signal in response to the modified frequency control signal;

said frequency control signal generating means including a passive resonant frequency determining element;

means for applying said first signal to said passive resonant frequency determining element; and, output means coupled to said passive resonant frequency determining element for deriving an oscillator output signal therefrom.

8. The apparatus of claim 7 wherein the frequency control signal generating means additionally includes:

means for shifting the phase of a portion of the first signal by a fixed amount to provide a phase shifted first signal; and, means for comparing the phase of an output of said passive resonant frequency determining element to the phase of the phase shifted first signal to generate the frequency control signal.

9. Apparatus for controlling the frequency of a periodic signal comprising:

means for generating a first signal controllable in frequency about a predetermined center frequency, said first signal having a noise power density below a predetermined level at Fourier frequencies above a first Fourier frequency;

means for generating a second signal having a frequency approximately equal to said center frequency and having a noise power density below said predetermined level at Fourier frequencies below a second Fourier frequency higher than the first Fourier frequency;

means for comparing the first and second signals in phase and for generating a phase control signal responsively to the phase comparison between the first and second signals;

means for generating a frequency control signal responsively to the first signal;

means for modifying the frequency control signal in response to the phase control signal at Fourier frequencies below the second Fourier frequency;

means for controlling the frequency of the first signal in response to the modified frequency control signal; and wherein the frequency control signal generating means comprises:

a resonant, frequency determining element;

means for applying the first signal to the resonant, frequency determining element to generate a frequency reference signal;

means for shifting the phase of a portion of the first signal by a fixed amount to provide a phase shifted first signal;

means for comparing the phase of the frequency reference signal to the phase of the phase shifted first signal to generate the frequency control signal; and, wherein said means for modifying the frequency control signal in response to the phase control signal comprises means for shifting the phase of the phase shifted first signal by an amount related to the magnitude of the phase control signal.

10. Apparatus for controlling the frequency of a periodic signal comprising:

means for generating a first signal controllable in frequency about a predetermined center frequency, said first signal having a noise power density below a predetermined level at Fourier frequencies above a first Fourier frequency;

means for generating a second signal having a frequency approximately equal to said center frequency and having a noise power density below said predetermined level at Fourier frequencies below a second Fourier frequency higher than the first Fourier frequency;

means for comparing the first and second signals in phase and for generating a phase control signal responsively to the phase comparison between the first and second signals;

means for generating a frequency control signal responsively to the first signal;

means for modifying the frequency control signal in response to the phase control signal at Fourier frequencies below the second Fourier frequency;

means for controlling the frequency of the first signal in response to the modified frequency control signal; and wherein the frequency control signal generating means comprises:

a resonant, frequency determining element;

means for applying the first signal to the resonant, frequency determining element to generate a frequency reference signal;

means for shifting the phase of a portion of the first signal by a fixed amount to provide a phase shifted first signal;

means for comparing the phase of the frequency reference signal to the phase of the phase shifted first signal to generate the frequency control signal; and additionally including means for filtering the phase control signal to remove all components having frequencies above a predetermined frequency lower than the second Fourier frequency; and;

wherein said means for modifying the frequency control signal in response to the phase control signal comprises means for shifting the phase of the phase shifted first signal by an amount related to the magnitude of the phase control signal.

11. Apparatus for controlling the frequency of an output signal from a voltage controlled oscillator with a high degree of stability comprising:

a crystal controlled oscillator providing an output signal;

means for generating a phase control signal related in amplitude to the phase relationship between the voltage controlled oscillator output signal and the crystal controlled oscillator output signal;

means for shifting the phase of a portion of the voltage controlled oscillator output signal by a predetermined fixed amount modified by a variable amount related to the amplitude of the phase control signal;

a frequency determining element excited by the voltage controlled oscillator output signal;

means for generating a frequency control signal related in amplitude to the phase relationship between the phase shifted voltage controlled oscillator output signal and an output signal from the frequency determining element excited by the voltage controlled oscillator output signal; and, means for controlling the frequency of the voltage controlled oscillator output signal responsively to the frequency control signal.

12. The apparatus of claim 11 including means for filtering the phase control signal to remove components having a frequency above a predetermined Fourier frequency.

13. Apparatus for generating a low noise, high frequency output signal comprising:

a crystal controlled signal source operable to generate a first signal at a first predetermined frequency;

a voltage controlled signal source operable to generate a second signal over a range of frequencies including said first predetermined frequency in response to a frequency control signal;

means for comparing said first and second signals in phase and for generating a phase control signal in response to the phase comparison between said first and second signals;

means for filtering said phase control signal to remove all frequency components above a second predetermined frequency;

an automatic frequency control loop for generating said frequency control signal, said control loop including a frequency determining element for generating a frequency reference signal in response to said second signal, a signal controllable phase shifter responsive to said second signal for providing a phase shifted second signal and means for comparing said reference signal and said phase shifted second signal in phase to thereby generate said frequency control signal;

circuit means for applying said filtered phase control signal to said signal controllable phase shifter to thereby modify said frequency control signal at frequencies below said second predetermined frequency; and, means for providing an output signal responsively to said frequency determining element in said automatic frequency control loop.

* * * * *